(12) United States Patent
Nolan et al.

(10) Patent No.: US 8,251,456 B2
(45) Date of Patent: Aug. 28, 2012

(54) LOCKING MECHANISM FOR ROTATING SEATS

(75) Inventors: Michael A. Nolan, Greenboro, NC (US); William J. Luebke, Aurora, IL (US)

(73) Assignee: Kustom Seating Unlimited, Bellwood, IL (US)

( * ) Notice: Subject to any disclaimer, the term of this patent is extended or adjusted under 35 U.S.C. 154(b) by 375 days.

(21) Appl. No.: 12/623,900

(22) Filed: Nov. 23, 2009

(65) Prior Publication Data

US 2011/0121631 A1    May 26, 2011

(51) Int. Cl.
*B60N 2/14* (2006.01)

(52) U.S. Cl. ............ 297/463.2; 297/217.2; 297/344.22; 74/512

(58) Field of Classification Search ............... 297/217.2, 297/344.1, 344.21, 344.22, 378.13, 463.2; 74/512, 542
See application file for complete search history.

(56) References Cited

U.S. PATENT DOCUMENTS

| | | | |
|---|---|---|---|
| 787,530 A * | 4/1905 | McComb | 74/539 |
| 1,644,632 A | 10/1927 | Brooks | |
| 1,760,653 A | 5/1930 | Mayer | |
| 1,876,247 A | 9/1932 | Knight | |
| 1,879,853 A | 9/1932 | Mayer | |
| 1,937,578 A | 12/1933 | Knight | |
| 2,154,600 A | 4/1939 | Bell | |
| 2,204,218 A | 6/1940 | Hill | |
| 3,343,428 A * | 9/1967 | Hackbarth | 74/478 |
| 4,779,927 A * | 10/1988 | Trutter et al. | 297/378.13 |
| 4,925,227 A | 5/1990 | Bateman | |
| 5,649,684 A | 7/1997 | Denis et al. | |
| 5,733,006 A * | 3/1998 | Woods | 74/529 |
| 5,762,401 A * | 6/1998 | Bernard | 297/378.13 |
| 5,855,414 A * | 1/1999 | Daniel et al. | 297/378.13 |
| 6,139,076 A * | 10/2000 | Hara et al. | 292/336.3 |
| 6,302,483 B1 | 10/2001 | Ricaud et al. | |
| 6,854,567 B2 | 2/2005 | Suzuki | |
| 7,226,129 B2 * | 6/2007 | Brandes et al. | 297/378.13 |
| 7,416,254 B2 * | 8/2008 | Jennings | 297/378.12 |
| 2005/0194826 A1 | 9/2005 | O'Callaghan et al. | |
| 2006/0108847 A1 | 5/2006 | O'Callaghan et al. | |
| 2006/0170270 A1 * | 8/2006 | Inoue et al. | 297/378.12 |

* cited by examiner

*Primary Examiner* — Peter R. Brown
(74) *Attorney, Agent, or Firm* — McCracken & Frank LLC

(57) ABSTRACT

A locking mechanism comprises an elongate body having first and second rails each having a first end and a second end and a void disposed therebetween. Lock slots are disposed in the first end of each rail and a pad is connected to each of the rails at the second ends to join the first and second rails. A mid bar is rotatably connected to the first and second rails and positioned within the void. An extension is disposed on a second end of the mid bar, wherein the extension provides a visual indication of both a locked state and an unlocked state.

15 Claims, 5 Drawing Sheets

LOCKING MECHANISM FOR ROTATING SEATS

REFERENCE REGARDING FEDERALLY SPONSORED RESEARCH OR DEVELOPMENT

Applicants understand that the United States government may have the right in limited circumstances to require the patent owner to license to the government and/or others on reasonable terms as provided for by the terms of Contract No.: DTRT57-07-R-SBIR awarded by the Department of Transportation (DOT) SBIR (07-FR1).

CROSS REFERENCE TO RELATED APPLICATIONS

Not applicable.

SEQUENTIAL LISTING

Not applicable

FIELD OF THE INVENTION

The present disclosure generally relates to a locking mechanism for rotating seats, and more particularly, to a locking mechanism including a visual indication of a locked state.

BACKGROUND

Locking mechanisms for seats have been developed of a type that are complicated, expensive to manufacture, and incompatible with existing seats. Such locking mechanisms also do not meet current safety standards in crashes, for example, in rollovers. In other instances it is difficult to tell if a locking mechanism is properly locked, especially if a multitude of locks need to be checked, for example on a train or bus.

In one prior art locking mechanism, a fixing mechanism may be used to secure a seat for a vehicle to a floor of the vehicle. The fixing mechanism is adapted to cooperate with retaining means disposed on the floor. The fixing mechanism includes a locking member that slides transversely with respect to the direction that the locking member is inserted into the retaining means.

SUMMARY

According to one aspect of the present disclosure, a locking mechanism comprises an elongate body having first and second rails each having a first end and a second end and a void disposed therebetween. Lock slots are disposed in the first end of each rail and a pad is connected to each of the rails at the second ends to join the first and second rails. A mid bar is rotatably connected to the first and second rails and positioned within the void. An extension is disposed on a second end of the mid bar, wherein the extension provides a visual indication of both a locked state and an unlocked state.

According to another aspect of the present disclosure, a locking mechanism for a seat comprises a body having a first and a second rails having lock slots disposed in first ends thereof and a pad disposed at first ends thereof to connect the rails, wherein the pad includes a slot disposed therethrough. A mid bar is attached to each of the rails at a first point and a second point, wherein the mid bar rotates about the first point and moves in a substantially vertical motion at the second point.

According to yet a further aspect of the present disclosure, a method of locking a seat into a locked position is disclosed. The method comprises the steps of providing a locking mechanism having a body with a lock slot at a first end thereof and a mid bar rotatably connected to the body and including a protrusion at a first end thereof, moving a seat frame into the lock slot, wherein the frame presses downwardly on the protrusion of the mid bar and rotates the mid bar into a locked position, and visually verifying the locked state of the locking mechanism.

BRIEF DESCRIPTION OF THE DRAWINGS

Other aspects and advantages of the present disclosure will become apparent upon consideration of the following detailed description, wherein similar structures have similar reference numbers.

DETAILED DESCRIPTION

While specific embodiments are discussed herein, it is understood that the present disclosure is to be considered only as an exemplification of the principles of the disclosure. For example, a locking mechanism may have other shapes and sizes beyond the ones depicted herein. Therefore, the present disclosure is not intended to limit the disclosure to the embodiments illustrated.

Figure 1:
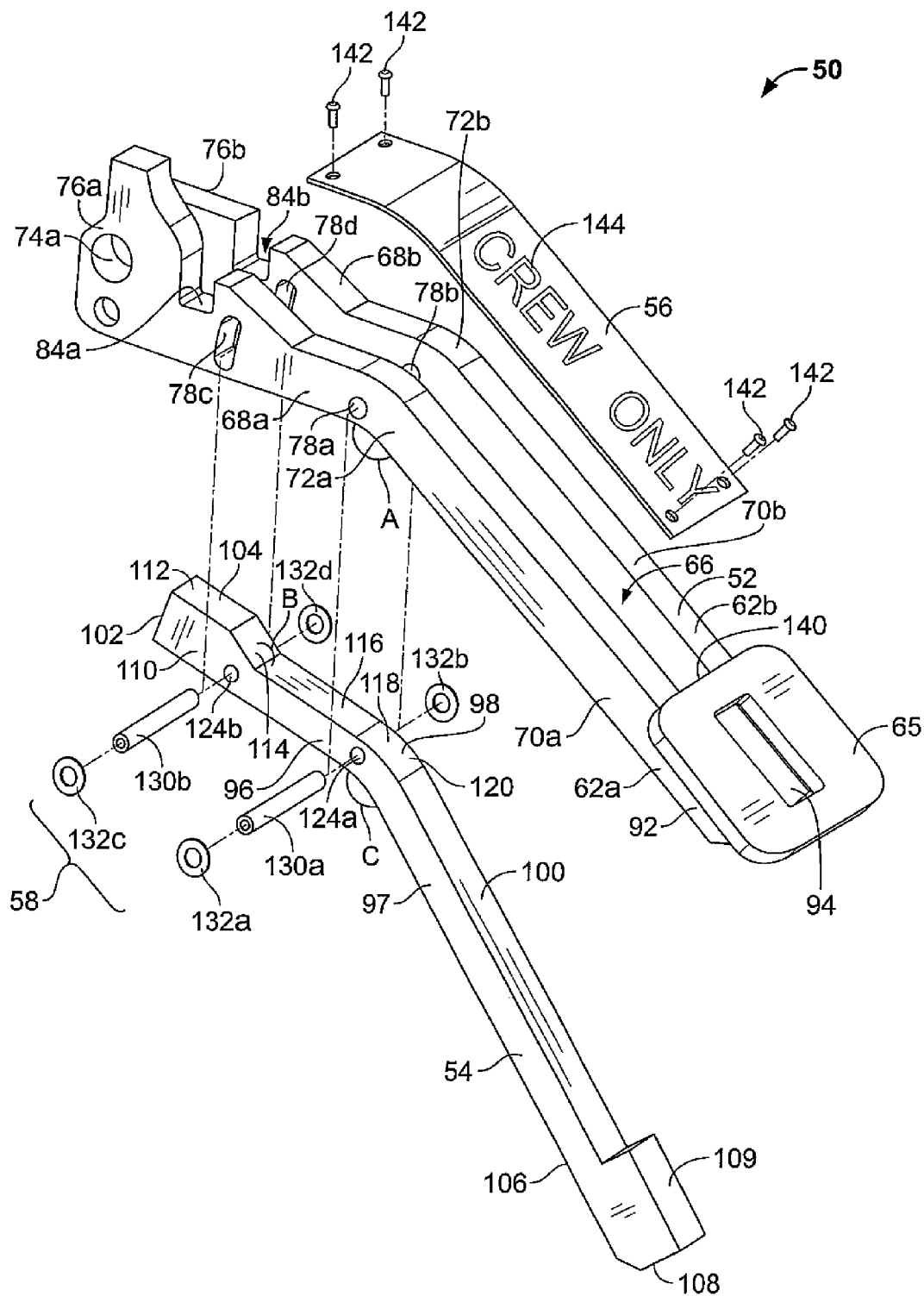
FIG. 1 is an exploded isometric view of a locking mechanism having an elongate body, a mid bar, and a cover.
Figure 2:
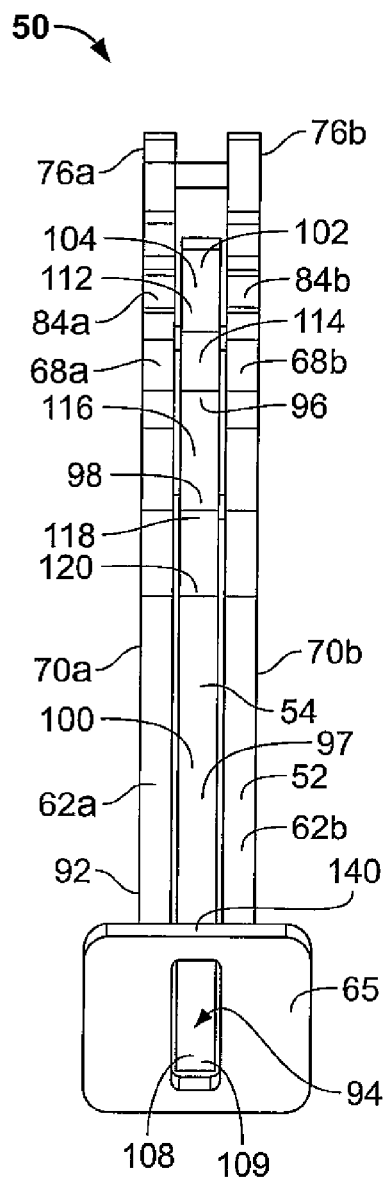
FIG. 2 is a top elevational view of the locking mechanism of FIG. 1 with the cover removed for clarity.
Figure 3:
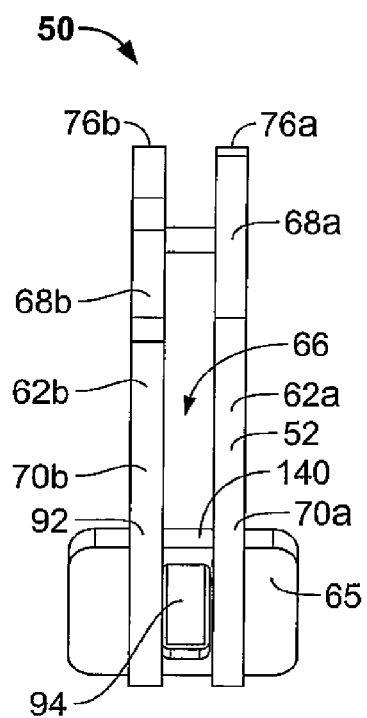
FIG. 3 is a bottom elevational view of the locking mechanism of FIG. 1 with the mid bar and cover removed for clarity.

FIGS. 1-3 illustrates a locking mechanism 50 having an elongate body 52, a mid bar 54, and a cover 56 that are connected by, for example, one or more attachment mechanisms 5S, the detail of which will be discussed in greater detail hereinafter. The body 52 comprises a first rail 62a and a second rail 62b that are generally parallel to one another and connected by a pad 65 to form a continuous structure having a void 66 therebetween. The rails 62a, 62b are generally four-sided and include first and second portions 68a, 68b and 70a, 70b that are angled with respect to one another at intersections 72a, 72b of the first and second portions 68a, 68b and 70a, 70b. An angle A formed by the first and second portions 68a, 68b and 70a, 70b is preferably between about 45 degrees and about 260 degrees. Although the first and second portions 68a, 68b, and 70a, 70b, are shown with an angle A created at the intersections 72a, 72b, the first and second portions 68a, 68b, and 70a, 70b, may be at a 180 degree angle that essentially creates a substantially linear plane between the first and second portions 68a, 68b, and 70a, 70b. One or both of the rail(s) 62a, 62b include an opening 74a (only shown in the rail 62a) disposed at a first end 76a, 76b thereof that may allow the locking mechanism 50 to be attached to a seat frame (not shown). The rails 62a, 62b further include a plurality of secondary openings that includes a first set of secondary openings 78a, 78b, and a second set of secondary openings 78c, 78d, wherein the first set of secondary openings 78a, 78b are preferably in alignment with each other and the second set of secondary openings 78c, 78d are preferably in alignment with each other to allow the body 52 and mid bar 54 to interact, as discussed in greater detail hereinafter. The second set of secondary openings 78c, 78d are disposed through the first portions 68a, 68b of the rails 62a, 62b and have an elliptical shape that allow the mid bar 54 to slide generally vertically from an unlocked position to a locked position, again as discussed in greater detail below. The first set of secondary openings 78a, 78b, disposed adjacent the intersections 72a, 72b have a circular shape and are adapted to secure the rails 62a, 62b of the body 52 to the mid bar 54. In one embodiment, the body 52 is constructed of a carbon steel weldment. Illustratively, other suitable materials for constructing the body 52 include stainless steel, nickel, aluminum, other alloys, blends of such constituents, and the like. The body 52 may be a casting or made by other manufacturing methods. Depending on the application, other materials may be used as well although particular materials and methods of manufacturing may be used to provide the desired strength properties.

The rails 62a, 62b further includes lock slots 84a, 84b that are aligned with one another disposed in the first portions 68a, 68b thereof between the openings 74a, 74b at the first ends 76a, 76b and the second set of secondary openings 78c, 78d. The lock slots 84a, 84b are adapted to interact with a frame of a rotating seat (shown and discussed in relation to FIG. 3). The lock slots 84a, 84b are depicted in a substantially U shape, but may be other shapes and sizes to account for different seat frames.

Referring still to FIGS. 1-3, the pad 65 is disposed at a second end 92 of the body 52 connecting the rails 62a, 62b and contains an elongate slot 94 therethrough, wherein the slot 94 is generally parallel to longitudinal extents of the rails 62a, 62b. The pad 65 is generally rectangular in shape and may extend outwardly beyond the edges of the first and second rails 62a, 62b, respectively. The pad 65 is attached to each rail 62a, 62b of the body 52 to form a unitary structure. Optionally, the pad 65 may be formed of any size and shape, as long as the slot 94 is formed therethrough and the function of the locking mechanism 50 is not changed thereby. In one embodiment, the pad 65 is constructed of stainless steel. Preferably, the steel is brushed. Illustratively, other suitable materials for constructing the pad 65 include nickel, aluminum, other alloys, blends of such constituents, and the like. If the body 52 is constructed of steel, it is preferable that the pad 65 is also constructed of steel or another material that may easily be welded or connected to the body 52.

Still referring to FIGS. 1-3, the mid bar 54 has a shape that is substantially complementary to the shape of the rails 62a, 62b. In particular, the mid bar 54 includes first and second portions 96, 97 that are angled with respect to one another at a second intersection 98 of the first and second portions 96, 97. An angle C formed by the first and second portions 96, 97 is preferably between about 45 degrees and about 260 degrees. Although the first and second portions 96, 97, are shown with an angle C, the first and second portions 96, 97 may be at a 180 degree angle that essentially creates a substantially linear plane. The angle C is preferably substantially similar to the angle A. The mid bar 54 further includes a first end 102 located at an end of the first portion 96, wherein the first end 102 includes a raised protrusion 104. The mid bar 54 further includes a second end 106 located at an end of the second portion 97, wherein the second end 106 includes an upwardly extending extension 108. The protrusion 104 on the first end 102 includes upwardly extending sidewalls 110 that terminate to a substantially flat top wall 112. The top wall 112 tapers downwardly at an inclined portion 114 at an angle B that is preferably between about 80 degrees to about 260 degrees and more preferably about 100 degrees to about 200 degrees. The inclined portion 114 tapers into a substantially flat top wall 116 that ends at a bent portion 118 formed at the second intersection 98. The extension 108 on the second end 106 is preferably rectangular in shape and corresponds to the slot 94 formed in the pad 65. The length and width of the extension 108 are smaller than the corresponding dimensions of the slot 94 such that the extension 108 can extend through the slot 94, as shown in FIG. 3. The mid bar 54 further includes holes 124a, 124b extending therethrough that are substantially similar in size. As shown in FIG. 1, the hole 124a closest to the intersection 98 is approximately the same size as the first set of secondary openings 78a, 78b disposed through the rails 62a, 62b. Preferably, the size and shape of the mid bar 54 allows the mid bar 54 to fit and rotate within the void 66 formed between the first and second rails 62a, 62b, as discussed hereinbelow.

The body 52 and mid bar 54 are attached to each other using the attachment mechanism 58 to allow substantially vertical movement at a point above the second set of secondary openings 78c, 78d, and rotating at or around the intersections 72a, 72b, 98. In one embodiment, the attachment mechanism 58 is in the form of roll pins 130a, 130b and washers 132a, 132b, 132c, 132d. When the mid bar 54 is positioned between the rails 62a, 62b of the body 52, the roll pin 130a is inserted through the opening 78a in the rail 62a, through a corresponding hole 124a in the mid bar 54, and through the corresponding opening 78b in the rail 62b. In addition, the roll pin 130b is inserted through the opening 78c in the rail 62a, through a corresponding hole 124b in the mid bar 54, and through the corresponding opening 78d in the rail 62b. After the roll pins 130a, 130b are in place, the washers 132a-d are inserted around the respectively roll pins 130a, 130b to secure the body 52 to the mid bar 54. The pin 130b (attached to the mid bar 54) closest to the first end 102 of the mid bar 54 is adapted to slide in a substantially vertical manner in the second set of elliptical secondary openings 78c, 78d of the body 52.

Although the attachment mechanism 58 is depicted as roll pins 130a, 130b and washers 132a-d, the attachment mechanism can take other forms so long as it secures the body 52 to the mid bar 54, allows vertical movement at a point above the intersections 78c, 78d, and allows rotational movement about the intersections 72a, 72b, 98.

The locking mechanism 50 also optionally includes the cover 56 that is attached to and extends over the first portions 68a, 68b and the second portions 70a, 70b of the body. The cover 56 may extend all the way to an edge 140 of the pad 65 or may extend only along only a portion of the body 52. The cover 56 is secured to the body 52 using any method, such as screws 142 (shown in FIG. 1), adhesive, or any other method that allows the cover 56 to remain attached to the body 52. The cover 56 also optionally includes text 144, such as, for example, "Crew Only." The cover 56 is preferably brushed stainless steel, but may be constructed of other materials as desired and as disclosed herein with respect to the body 52 and the pad 65. The cover 56 serves a variety of purposes including preventing debris from being lodged in and possibly damaging the locking mechanism 50. The text 144 on the cover 56 also provides a safety warning to passengers that the locking mechanism 50 should only be operated by specified personnel.

Figure 4:
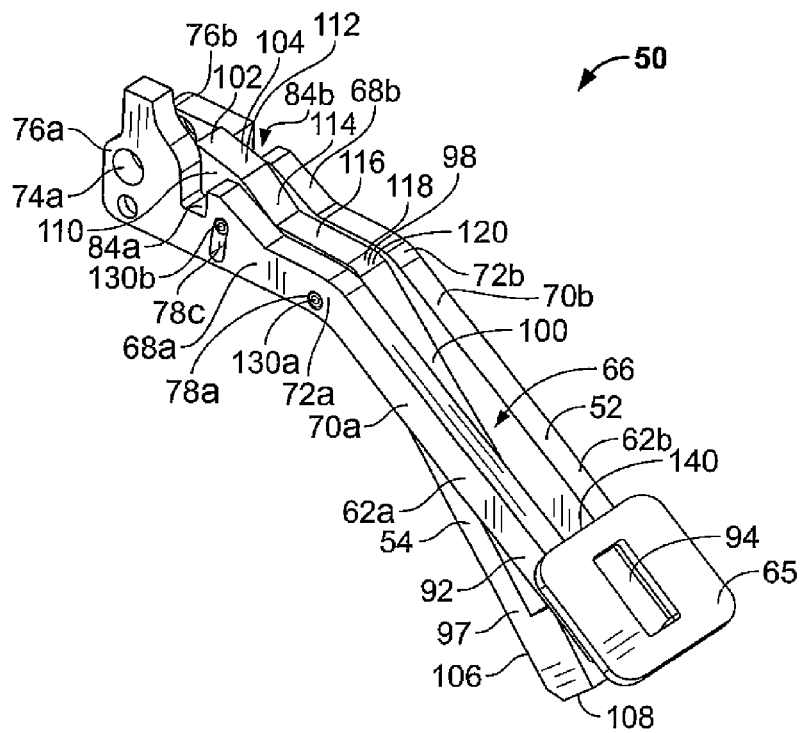
FIG. 4 is an isometric view of the locking mechanism of FIG. 1 disposed in a first, unlocked position with the cover removed for clarity.
Figure 5:
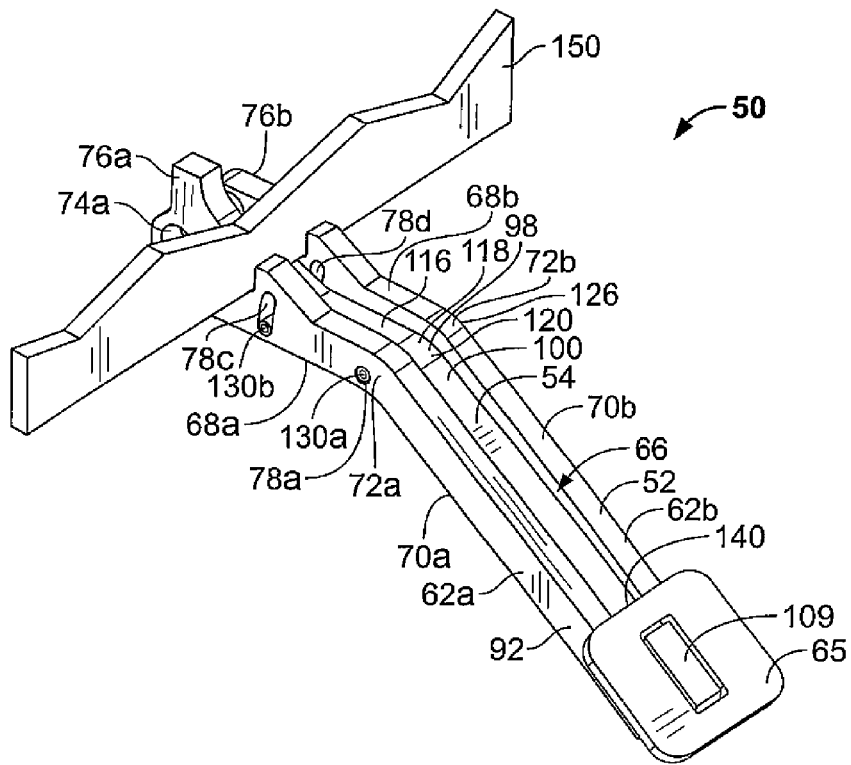
FIG. 5 is an isometric view similar to FIG. 4 of the locking mechanism of FIG. 1 disposed within a seat frame in a second, locked position with the cover removed for clarity.
Figure 6:
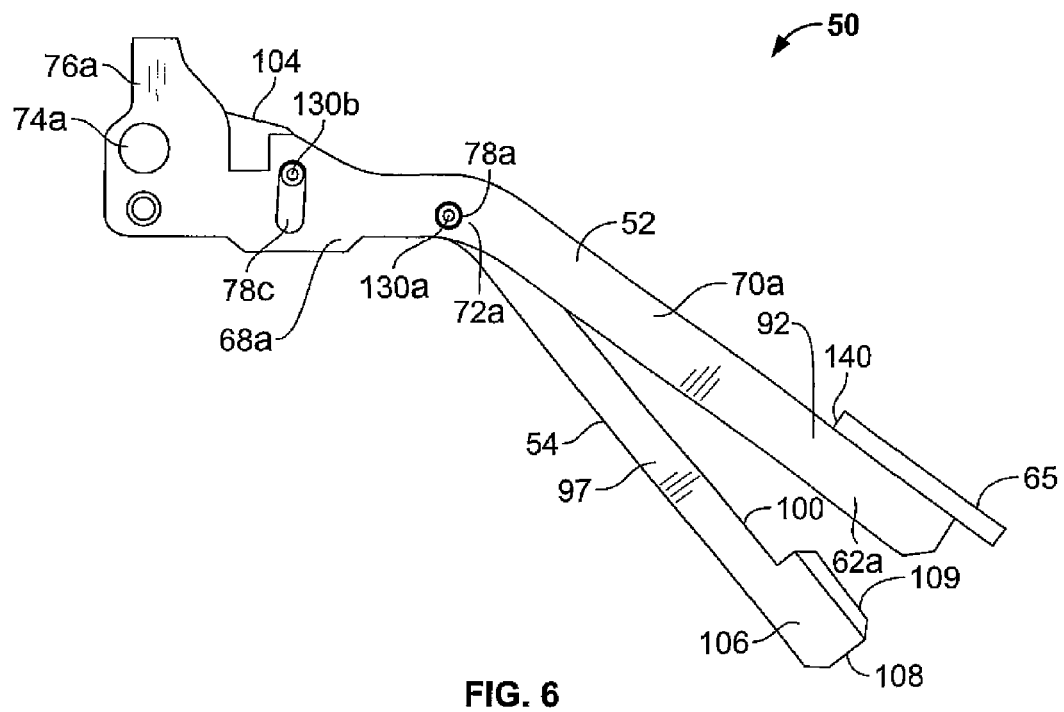
FIG. 6 is a side view of the locking mechanism of FIG. 1 disposed in a first, unlocked position.
Figure 7:
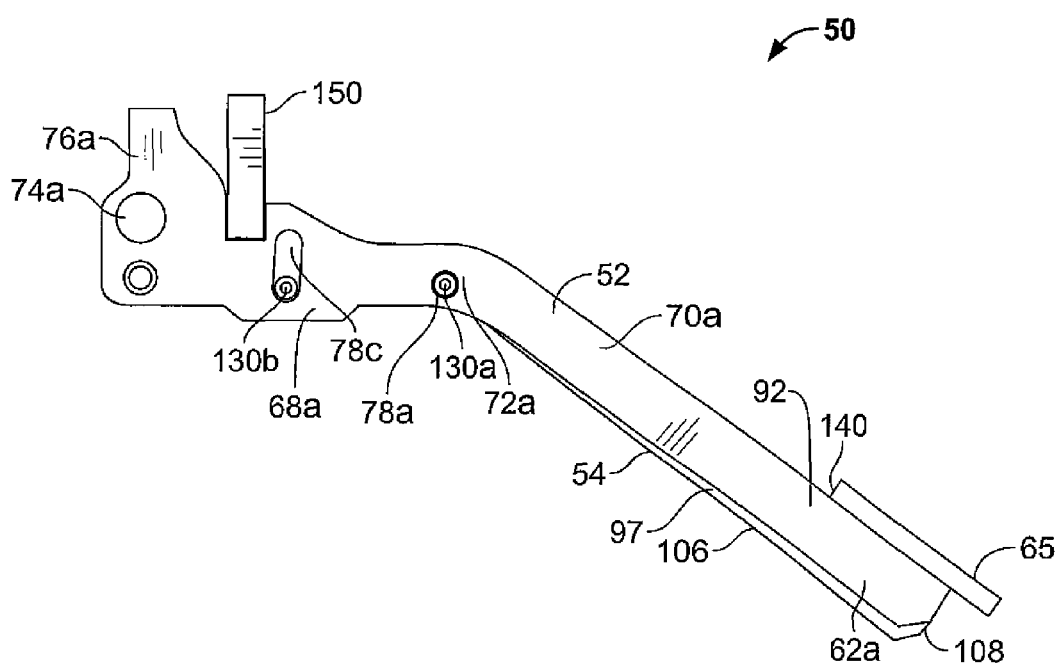
FIG. 7 is a side view of the locking mechanism of FIG. 1 disposed in a second, locked position.
Figure 8:
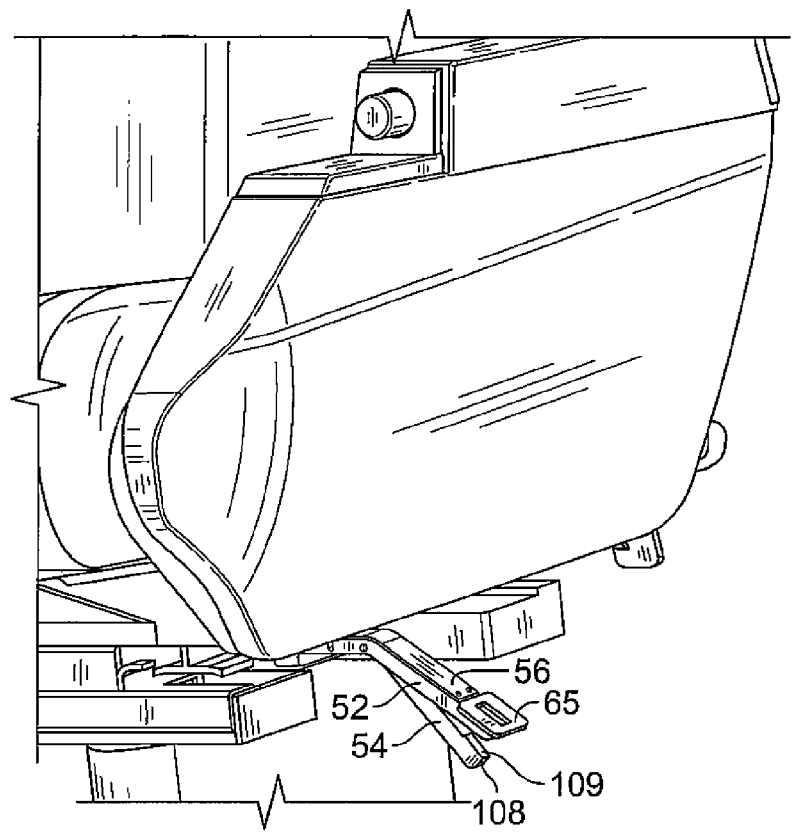
FIG. 8 is an isometric view of the locking mechanism of FIG. 1 disposed in a first, unlocked position.
Figure 9:
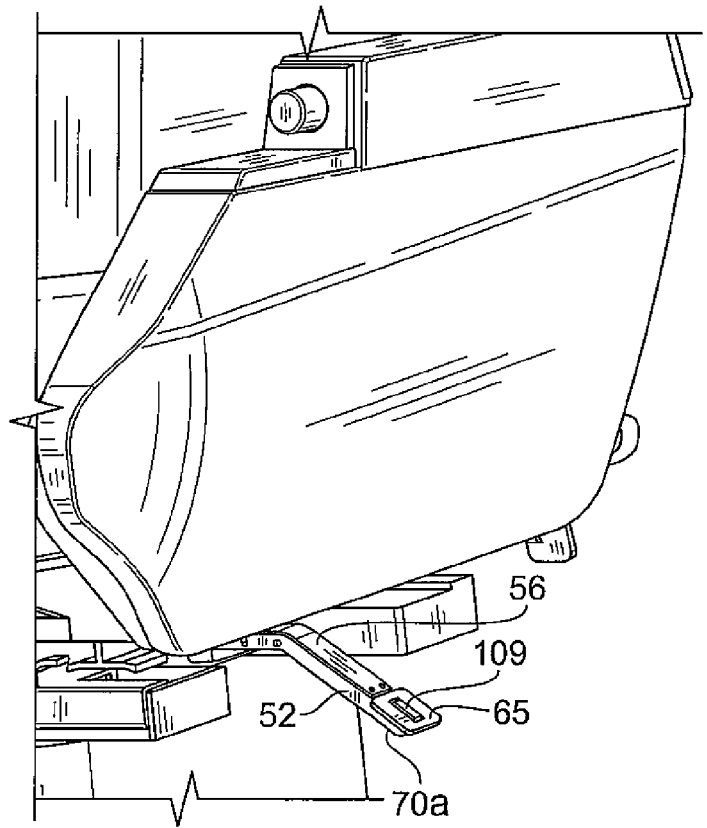
FIG. 9 is an isometric view of the locking mechanism of FIG. 1 disposed in a second, locked position.

Before use, the locking mechanism 50 is positioned in a first, unlocked position, as shown in FIGS. 2, 4, and 6. In the first position, the mid bar 54 hangs below the body 52 and the protrusion 104 at the first end 102 of the mid bar 54 extends upwardly past the lock slots 84*a*, 84*b* of the first and second rails 62*a*, 62*b* (as best seen in FIG. 4). In the first position, a seat frame is not disposed within the lock slots 84*a*, 84*b* and thus, is free to rotate. As a seat frame member 150, shown in FIG. 5, is inserted into the lock slots 84*a*, 84*b*, the frame member 150 pushes downwardly on the protrusion 104. At the same time, the mid bar 54 rotates about the roll pins 130*a*, 130*b* disposed at the intersections 72*a*, 72*b*, and the extension 108 at the second end 106 rotates upwardly such that the extension 108 protrudes and is visible through the slot 94 in the pad 65. Once the frame member 150 pushes the extension 108 through the slot 94, the locking mechanism 50 is in a second or locked position.

The mid bar 54 is preferably painted to help a user visually identify the locked or unlocked position. In one embodiment, the mid bar 54 is painted red, except for a top wall 109 of the extension 108, which is painted green. When the mid bar 54 is unlocked or not correctly positioned, the green top wall 109 is not readily visible to the user because the extension 108 does not protrude through the slot 94. At the same time, the red mid bar 54 is visible from afar because the mid bar 54 is hanging below the body 52 (best seen in FIG. 6) and provides a warning that the locking mechanism 50 is not in a locked position. Once the frame member 150 is correctly positioned within the lock slots 84*a*, 84*b* and the seat is locked, the green top wall 109 protrudes through the slot 94 and is visible to the user. In such illustrative example, the green visually indicates that the seat is properly locked.

Additional components may be optionally added to the locking mechanism 50 to enhance the utility thereof. For example, reflective tape or photo luminescent paint may be applied to any part of the locking mechanism 50 including all or portions of the body 52, the mid bar 54, and/or the cover 56 to aid a user in locating or utilizing the locking mechanism 50 in low light or in other conditions when there may be poor visibility. Other lighting elements may also be used to illuminate the locking mechanism 50 to indicate the locked or unlocked position, such as, for example, light emitting diodes (LED's).

Various details shown in FIGS. 1-7 may be modified as will be apparent to those of skill in the art without departing from the disclosed principles. Other methods and materials suitable for forming structures of the present disclosure may also be utilized.

INDUSTRIAL APPLICABILITY

The present invention provides a locking mechanism that allows for a user to visually verify a locked or an unlocked state of the locking mechanism. In particular, a first portion of the locking mechanism may be a first color and visible during the unlocked state and a second portion of the locking mechanism may be a second color and visible during the locked state.

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out same.

We claim:

1. A locking mechanism, comprising:
   an elongate body having first and second rails each having a first end and a second end and a void disposed therebetween, a slot disposed in the first end of each rail, and a pad connected to each of the rails at the second ends to join the first and second rails, wherein the pad includes an opening;
   a mid bar rotatably connected to the first and second rails by an attachment mechanism and positioned within the void, wherein the mid bar includes a first end and a second end; and
   an extension disposed at the second end of the mid bar, wherein the extension is configured to extend through the opening in the pad after rotation of the mid bar in a first direction, wherein the extension extends through the opening in the pad when the locking mechanism is put into a locked state, and wherein the extension is a different color than the rest of the mid bar, such that the mid bar provides a visual indication of the locked state.

2. The locking mechanism of claim 1, wherein the attachment mechanism is in the form of roll pins and washers.

3. The locking mechanism of claim 2, wherein the roll pins and washers are inserted into secondary openings through the mid bar and the body.

4. The locking mechanism of claim 1, wherein a protrusion is disposed at a first end of the mid bar and extends upwardly through the slot when the locking mechanism is in an unlocked state.

5. The locking mechanism of claim 4, wherein the mid bar rotates into a locked position when the protrusion is pressed downwardly by a seat member.

6. The locking mechanism of claim 1, wherein at least one of the body and the mid bar is constructed of carbon steel weldment.

7. The locking mechanism of claim 1, wherein the locking mechanism further includes a cover attached to the body.

8. A locking mechanism for a seat, comprising:
   a body having a first and a second rails having lock slots disposed in first ends thereof and a pad disposed at second ends thereof to connect the rails, wherein the pad includes a slot disposed therethrough; and
   a mid bar attached to each of the rails at a first point and a second point, wherein the mid bar includes a first end having a protrusion and a second end having an extension, wherein the mid bar rotates about the first point and moves in a substantially vertical motion at the second point when the protrusion is pressed downwardly, wherein rotation of the mid bar about the first point brings the mid bar extension through the slot of the pad and wherein the mid bar extension is a different color than the rest of the mid bar, such that the locking mechanism provides a visual indication of a locked state when the mid bar extension extends through the slot of the pad.

9. The locking mechanism of claim 8, wherein the first point includes a first set of openings disposed through the first and second rails and the second point includes a second set of openings disposed through the first and second rails.

10. The locking mechanism of claim 9, wherein the first set of openings are in the shape of a circle.

11. The locking mechanism of claim 9, wherein the second set of openings are elliptical in shape.

12. The locking mechanism of claim 8, wherein each of the first and second rails includes first and second portions that are connected at an intersection, wherein an angle of about 90 degrees to about 170 degrees is formed at each intersection by corresponding first and second portions.

13. A method of locking a seat into a locked position, the method comprising the steps of:
    providing a locking mechanism having a body with a lock slot at a first end thereof and a mid bar rotatably connected to the body and including a protrusion at a second end thereof, wherein the mid bar is substantially out of alignment with the body in an unlocked state;
    moving a seat frame into the lock slot, wherein the frame presses downwardly on the protrusion of the mid bar and rotates the mid bar into a locked position substantially in alignment with the body; and
    visually verifying the locked state of the locking mechanism based on the rotational position of the mid bar relative to the body.

14. The method of claim 13, wherein the step of visually verifying includes the step of color coding the locking mechanism with first and second colors, wherein the first color is disposed on a first portion of the mid bar and the second color is disposed on a second portion of the mid bar, and wherein the first color is not visible when the locking mechanism is in the locked state and the second color is not visible when the locking mechanism is in an unlocked state.

15. The method of claim 14, wherein the first color is red and the second color is green.

* * * * *